United States Patent
Berry et al.

(10) Patent No.: US 7,191,602 B2
(45) Date of Patent: Mar. 20, 2007

(54) STORAGE OF $H_2$ BY ABSORPTION AND/OR MIXTURE WITHIN A FLUID MEDIUM

(75) Inventors: Gene David Berry, Mountain View, CA (US); Salvador Martin Aceves, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 168 days.

(21) Appl. No.: 10/869,562

(22) Filed: Jun. 15, 2004

(65) Prior Publication Data
US 2004/0250552 A1 Dec. 16, 2004

Related U.S. Application Data

(60) Provisional application No. 60/479,125, filed on Jun. 16, 2003.

(51) Int. Cl.
*F17C 11/00* (2006.01)
*F17C 5/02* (2006.01)
*F17C 7/02* (2006.01)

(52) U.S. Cl. .......................... 62/46.2; 62/47.1; 62/50.1
(58) Field of Classification Search ................. 62/54.1, 62/50.1, 49.1, 46.2, 47.1
See application file for complete search history.

(56) References Cited

U.S. PATENT DOCUMENTS

| | | | |
|---|---|---|---|
| 3,030,780 A * | 4/1962 | Loveday | 62/48.3 |
| 3,147,593 A * | 9/1964 | Garrett | 60/39.465 |
| 3,354,662 A * | 11/1967 | Daunt | 62/601 |
| 3,389,555 A * | 6/1968 | Goldstein et al. | 60/39.465 |
| 3,930,375 A * | 1/1976 | Hofmann | 62/45.1 |
| 4,601,873 A * | 7/1986 | Jahn | 376/308 |
| 5,154,062 A * | 10/1992 | Gaumer et al. | 62/54.1 |
| 5,280,710 A * | 1/1994 | Gaumer et al. | 62/54.1 |
| 5,548,962 A * | 8/1996 | Luger et al. | 62/50.1 |
| 6,374,617 B1 * | 4/2002 | Bonaquist et al. | 62/6 |
| 6,516,619 B2 | 2/2003 | Clampitt | |
| 6,619,336 B2 * | 9/2003 | Cohen et al. | 141/83 |
| 2002/0116931 A1 * | 8/2002 | Lak et al. | 62/45.1 |
| 2004/0060303 A1 * | 4/2004 | Haberbusch | 62/6 |

FOREIGN PATENT DOCUMENTS

WO    WO 02/39032 A2    5/2002

OTHER PUBLICATIONS

G.Berry et al, "Hydrogen Storage and Transportation." Lawrence Livermore National Laboratory, Technical Information Department's Digital Library. Sep. 20, 2002.

(Continued)

*Primary Examiner*—William C. Doerrler
(74) *Attorney, Agent, or Firm*—Michael C. Staggs; John H. Lee

(57) ABSTRACT

For the first time, a hydrogen storage method, apparatus and system having a fluid mixture is provided. At predetermined pressures and/or temperatures within a contained substantially fixed volume, the fluid mixture can store a high density of hydrogen molecules, wherein a predetermined phase of the fluid mixture is capable of being withdrawn from the substantially fixed volume for use as a vehicle fuel or energy storage having reduced and/or eliminated evaporative losses, especially where storage weight, vessel cost, vessel shape, safety, and energy efficiency are beneficial.

49 Claims, 2 Drawing Sheets

OTHER PUBLICATIONS

W. Streett et al, "Liquid—vapour equilibrium for hydrogen + nitrogen at temperatures from 63 to 110 K and pressures to 57 MPa." Chem. Thermodynamics 1978, 10, pp. 1089-1099.

J. Machado et al, "PVT Measurements of Hydrogen/Methane Mixtures at High Pressures."J. Chem. Eng. Data 1988, 33, pp. 148-152.

C. Young, "Inorganic Compounds." pp. 589-600.

R. McCarty, "Hydrogen: Its Technology and Implications." Hydrogen Properties, vol. III. National Aeronatucis and Space Administration Special Publication 3089 (1975). CRC Press, Inc., Cleveland, Ohio.

R. Wiebb et al, "The Solubility of Hydrogen in Liquid Ammonia at 25, 50, 75 and 100° and at Pressures to 1000 Atmospheres." The Solubility of Hydrogen in Liquid Ammonia, Nov. 1934, pp. 2357-2360.

* cited by examiner

STORAGE OF $H_2$ BY ABSORPTION AND/OR MIXTURE WITHIN A FLUID MEDIUM

RELATED APPLICATION

This application claims the benefit of U.S. Provisional Application No. 60/479,125, filed Jun. 16, 2003, and entitled, "Storage of Hydrogen By Absorption In Fluids," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a method of storing molecules whose standard state under ambient conditions is as a gas. More specifically, the present invention relates to a method and system of storing hydrogen and its isotopes by absorption and/or mixture within a fluid medium, such as a fluid mixture for use as a fuel, energy storage, or chemical applications.

2. State of Technology

There is considerable interest in replacing fossil fuels with hydrogen because of hydrogen's high energy density per unit weight, its ready availability through the electrolysis of water, and the absence of polluting byproducts from its use. A number of technological components present challenges in making this transition to a hydrogen economy, and in the development of appropriate systems and infrastructure that can integrate into those that already exist.

In the hydrogen economy, hydrogen is targeted to be stored in different places, in different unit volumes, and in operationally varying configurations, as it moves down the supply chain from producers to consumers. Producers may need to store large inventory volumes. Hydrogen may be stored in transporting vessels as it travels from producers to distributors. Fuel distributors, including stations that deliver fuel for vehicles, other power-driven devices, and electronic devices, often may need large quantities on hand. Small point-of-use storage containers are destined to be required in power plants, vehicles, and personal electronics. All these hydrogen storage applications have in common the need to safely maximize the amount of hydrogen stored per unit of storage system volume, and differ fundamentally from the gasoline distribution system in which the fuel retains the same and incompressible form throughout the supply chain.

The standard methods of hydrogen storage are in the form of a gas compressed under high pressure or a liquid maintained at cryogenic temperatures. Safety, both real and perceived, is an often-raised criticism of high pressure hydrogen storage as a compressed gas, wherein such a method of hydrogen storage has historically been limited by the intrinsic compressibility of hydrogen gas and the strength of pressure vessel materials resulting in bulky, heavy and/or relatively costly hydrogen storage vessels.

Storage of hydrogen in the form of liquid hydrogen ($LH_2$) has therefore been a favored method of bulk storage and transportation of hydrogen under low pressure in lightweight and compact containers. However, hydrogen has the second lowest boiling point of any substance (20 K), making hydrogen liquefaction exceptionally complicated and energy intensive, requiring electricity equivalent to 30–40% of the fuel energy value of hydrogen. This low boiling point has also made evaporation of $H_2$ from small $LH_2$ tanks a difficult problem. Even after 20 years of development, the best vacuum-insulated automotive $LH_2$ tanks begin to vent hydrogen vapor after only a few days to relieve pressure buildup as heat flow into the tank from the environment warms the liquid hydrogen.

Storage of hydrogen in solid form by (reversible) chemical reaction with metals to create metallic hydrides has also been employed. Hydride materials typically have high theoretical hydrogen storage densities, but achieve only about 50% volumetric efficiency as hydride powders expand upon reaction with and absorption of hydrogen gas and can require heat exchange equipment. Hydrides also permit relatively low-pressure hydrogen storage, but rapid refueling requires increased pressures to overcome the heat resulting from the absorption of hydrogen gas and the exothermic reaction with the metal to form the metal hydride. Typical metallic hydrides are either relatively heavy (e.g. iron-titanium and lanthanum-nickel based hydrides) or have high decomposition energies requiring very high temperatures (e.g. magnesium hydride) to release hydrogen.

Hydrogen can also be stored by reversible chemical reaction with liquids. Aromatic molecules with carbon-carbon double bonds are the leading candidates for chemical storage of hydrogen in liquid form. A methylcyclohexane molecule ($C_7H_{14}$) for example, releases 3 $H_2$ molecules and becomes toluene ($C_7H_8$) when heated to temperatures as high as 650 K. Such a reaction has a theoretical reversible hydrogen storage density about 50 kg $H_2/m^3$ and capacity of 6 wt % $H_2$.

An alternative to chemical hydrogen storage (e.g., as solid metal hydrides or liquids) is adsorption of $H_2$ molecules onto lightweight high surface area solid adsorbents, such as carbon. Initial, typically cryogenic, $H_2$ adsorption research on high surface area carbons began in the 1960's and continued through the 1990's. The benefits of this approach decline with increasing pressure; however, as the volume of the adsorbent itself occupies volume available to hydrogen gas of ever higher densities. At pressures above about 200 atmospheres, removing the adsorbent usually increases hydrogen storage density at cryogenic temperatures. Finally, the physisorption of $H_2$ molecules onto an adsorbent surface is typically exothermic, complicating rapid refueling, especially under cryogenic conditions.

With the discovery of $C_{60}$ and related structures, carbon materials engineered on the atomic scale have been studied and proposed as $H_2$ adsorbents. For example, graphite nanofibers are a class of engineered carbon materials that have received significant attention with experimental claims of extraordinary $H_2$ storage densities. In addition, carbon nanotubes have indicated some potential to adsorb $H_2$ near room temperature but the current understanding of $H_2$ adsorption within such carbon nanotubes (or other engineered adsorbents) is still embryonic. The energetic and economic manufacturing costs of such advanced solid adsorbent materials are also currently unknown.

Accordingly, a need exists for a lightweight medium with reduced and/or eliminated evaporative hydrogen losses in a form that permits storage systems to operate at predetermined pressures lower than those presently adapted for high-pressure hydrogen gas storage and temperatures less extreme than those presently adapted for liquid hydrogen ($LH_2$) storage. The present invention is directed to such a need.

SUMMARY OF THE INVENTION

Accordingly, the present invention entails a method of storing hydrogen that includes: providing a container comprising a predetermined substantially fixed volume; providing a fluid mixture to the predetermined substantially fixed volume, wherein the fluid mixture includes hydrogen molecules; and providing a predetermined temperature and/or a predetermined pressure to said container so as to increase the density of the fluid mixture, wherein a predetermined phase of the fluid mixture is capable of being withdrawn from the container and utilized as a fuel.

Another aspect of the present invention is to provide a hydrogen storage apparatus that can contain a fluid mixture that includes hydrogen molecules in a predetermined substantially fixed volume. The density of the fluid mixture can be increased and a predetermined phase of the fluid mixture can be withdrawn and utilized as a fuel.

A final aspect of the present invention is to provide a hydrogen storage system that includes one or more primary containers with predetermined substantially fixed volumes that can contain fluid mixtures having hydrogen molecules. The density of such fluid mixtures can be increased and a predetermined phase of the fluid mixtures can be received by one or more secondary containers for fuel purposes.

Accordingly, the present invention provides a hydrogen storage method, apparatus, and system for use in vehicles, homes, fueling stations, hydrogen production facilities, etc., to achieve energy security while addressing issues, such as, urban air pollution, climate change and sustainability. Moreover, the present invention, as disclosed herein, reduces and/or eliminates evaporative losses, and can reduce the pressure needed for high density storage of $H_2$, which improves safety and allows refueling with reduced or eliminated heat generation, while improving vessel design flexibility, and vessel shape versatility.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
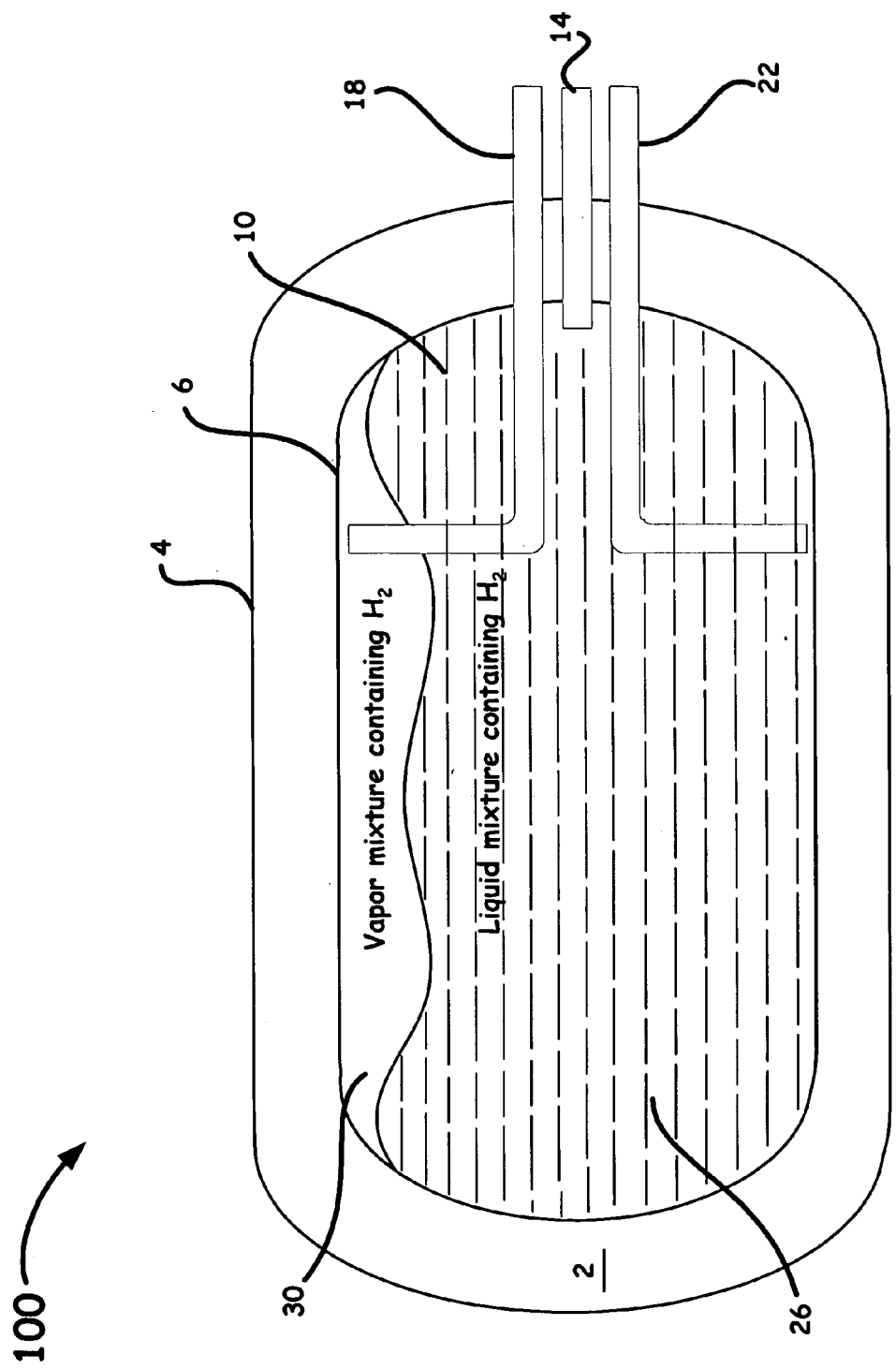
FIG. 1 illustrates a longitudinal cross-sectional view of an example embodiment of the present invention.

Referring now to the following detailed information, and to incorporated materials; a detailed description of the invention, including specific embodiments, is presented. The detailed description serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value; however, inherently contain certain errors necessarily resulting from the standard deviation found in their respective testing measurements.

General Description

The present invention is directed to the storage of hydrogen ($H_2$), e.g., $H_2$ molecules within a fluid medium, such as a mixture. Beneficial fluids can include, but are not limited to, nitrogen ($N_2$), Oxygen ($O_2$), carbon dioxide ($CO_2$), light inert gases (e.g., Argon), as well as carbon monoxide (CO), methane ($CH_4$), acetylene ($C_2H_2$), ethane ($C_2H_6$), ethylene ($C_2H_4$) ammonia ($NH_3$), propane ($C_3H_8$), and water ($H_2O$), wherein such fluid mixtures are maintained at predetermined conditions by regulating a temperature range at less than about their respective critical temperatures (i.e., often at less than about 647 Kelvin, more often between about 50 Kelvin and 126 Kelvin).

In the present discussion, while such example fluid mediums may be utilized in the present invention for the storage of hydrogen, nitrogen is generally used as the exemplary medium for illustrating operation of the present invention. Storing hydrogen in such a fluid medium and containing such a fluid medium in mobile (e.g., conformable) and/or stationary pressurized vessels as disclosed herein, is a beneficial way to provide an alternative storage system in a resultant mixture for domestic and industrial apparatus, such as, but not limited to, automotive (e.g., lightweight) and truck vehicles, hydrogen production facilities, refueling stations, etc. Additionally, while the benefits of utilizing fluid media as disclosed herein are readily apparent for fueling applications, it is not limited only to such. The present invention may also be generally used for any use requiring the storage of hydrogen, hydrogen molecules, and isotopes of hydrogen for applications, such as, but not limited to energy storage, chemical, and nuclear arrangements.

Unlike other $H_2$ storage approaches, storing hydrogen molecules within a fluid medium, such as, but not limited to liquid nitrogen, (for which $H_2$ absorption increases with temperature, indicating an endothermic process) cools such a storage medium upon mixing. By taking advantage of such a property, a storage medium, as utilized herein, is capable of having its volume decreased, e.g., when fueling a vehicle, which results in increasing $H_2$ capacity (i.e., density) at least greater than about 25 kg $H_2/m^3$ (i.e., 12.4 moles/liter), more often between about 25 kg/$m^3$ and about 50 kg $H_2/m^3$ (i.e., 24.8 moles/liter) by, for example, a means that includes controlling temperature ranges as discussed above and/or pressures of often less than about 15,000 pounds per square inch (psi), more often of down to less than about 5000 psi in predetermined commercial or customized storage containers having fixed storage volumes.

Nitrogen, utilized as a beneficial storage medium as disclosed herein, can be arranged to have an overall molecular concentration from about 33% $H_2$ to about 75% $H_2$, which corresponds to a weight percentage of $H_2$ from about 3.4 wt % $H_2$ to about 17.8 wt % $H_2$. More often the present invention, using nitrogen as the storage medium, can be arranged to have a molecular concentration from about 50% $H_2$ to about 66% $H_2$ in an $H_2/N_2$ mixture that corresponds to a weight percentage of $H_2$ which contains from about 6.7 wt % $H_2$ to about 12.3 wt % $H_2$. Such molecular concentrations using $N_2$, $CO_2$, Argon, etc., as the storage medium results in a safe and expendable $H_2$ storage medium having an approximate effective average weight (e.g., containing between about 13.5 wt % $H_2$ and about 22 wt % $H_2$ on an average basis between refuelings) of the mixture that is substantially lower in application when utilized as a vehicle fuel.

Accordingly, $H_2$ storage utilizing $N_2$ as a medium, provides a storage volume comparable to pure hydrogen gas compressed to about 5000 psi and about 15,000 psi at room temperature, but capable of being operated at lower pressures as discussed above, which contributes to a lower mechanical hazard and eases requirements for non-cylindrically shaped vessels (e.g., conformable vessels). Such a storage method, apparatus, and system as disclosed herein improves safety, refueling, design flexibility, vessel shape versatility, having reduced and/or eliminated evaporative losses at weight, volume, and capital cost targets comparable to known approaches.

Specific Description

Turning now to the drawings, FIG. 1 shows a longitudinal cross-sectional view of a beneficial hydrogen storage embodiment of the present invention, generally designated as reference numeral 100. Such a beneficial arrangement can include a pressure vessel 2 having an elongated cylindrical configuration as is typical of pressure vessel design in the art that is capable of being arranged as a stationary (e.g., a fueling station) and/or a mobile configuration, such as in a system for distributing the hydrogen storage medium of the present invention to such an example fueling station. As another arrangement, the hydrogen storage beneficial embodiment 100 can be arranged as an on-board storage container (e.g., a conformable container) to provide fuel for a light vehicle or a heavy-duty truck. By incorporating known in the art vessel technologies coupled with light-weight materials, such as, but not limited to, reinforced composite materials, such as carbon-fiber, aramid, the composite material sold under the trademark "Kevlar," etc., for constructing the inner pressure wall configurations, such vessels as disclosed herein, are capable of resisting corrosion, fatigue and catastrophic failure, enabling such vessels to be used in vehicles having constrained non-cylindrical physical spaces.

Returning to FIG. 1, pressure vessel 2 includes an outer shell 4 and an inner pressure container 6 surrounding and enclosing a substantially fixed storage volume 10. The term "substantially fixed storage volume and/or a substantially fixed volume" as used herein, includes a volume capable of remaining constant to within about 5% due to changes in pressure and temperature. Such a vessel 2 can also include an insulated means, for example, a vacuum multilayer insulation, to prevent heat transfer between inner pressure container 6 and outer shell 4. An inlet port 14 and a pair of outlet ports 18, 22 extending through inner pressure container 6 and outer shell 4, can regulate access into and out of fixed storage volume 10.

In the method of the invention, a beneficial medium, such as, but not limited to $LN_2$, is directed, for example, by an external pumping or condensing means (not shown) as known by those skilled in the art, through inlet port 14 to fill up to about 99%, more often up to about 95%, of fixed storage volume 10 and a temperature can be maintained between about 50 Kelvin and about 126 Kelvin by a means, such as, for example, an electrical heating means (not shown), a mechanical and/or a thermoelectric cooler (not shown), and any means capable of manipulating the spin states of hydrogen molecules to achieve the cooling of the mixture as known by those skilled in the art. In one beneficial arrangement, hydrogen gas molecules ($H_2$) can be pumped into fixed storage volume 10 by for example, a compressor, raising the pressure to a designed level. Thereafter, by controlling temperature between about 50 Kelvin and about 126 Kelvin (when utilizing $LN_2$ as the beneficial medium) and by maintaining pressures to less than about 5000 psi, the introduced hydrogen gas molecules, mixed into a selected medium, such as $LN_2$, i.e., with a liquid phase absorption energy of order of magnitude of 1 kJ/mole $H_2$, can form a mixture having a liquid and vapor phase or a single fluid phase when at pressures exceeding the saturation pressure for a predetermined mixture and for a predetermined temperature. Such a mixture enables the storage of a high density of hydrogen molecules of greater than about 25 kg $H_2/m^3$, more often between about 25 kg $H_2/m^3$ and about 50 kg $H_2/m^3$. As another beneficial arrangement, the fluid mixture that includes such a phase(s) as disclosed above can be premixed and/or precooled and communicated to fixed storage volume 10. Moreover, by regulating temperatures and pressures within the disclosed ranges herein, such a mixture can be arranged to include a liquid mixture 26 containing $H_2$ and/or an overlying vapor phase containing $H_2$ that is capable of being extracted through respective outlet ports 22, 18 to be used as a fuel for apparatus, such as, but not limited to, light-weight vehicles and trucks.

Figure 2:
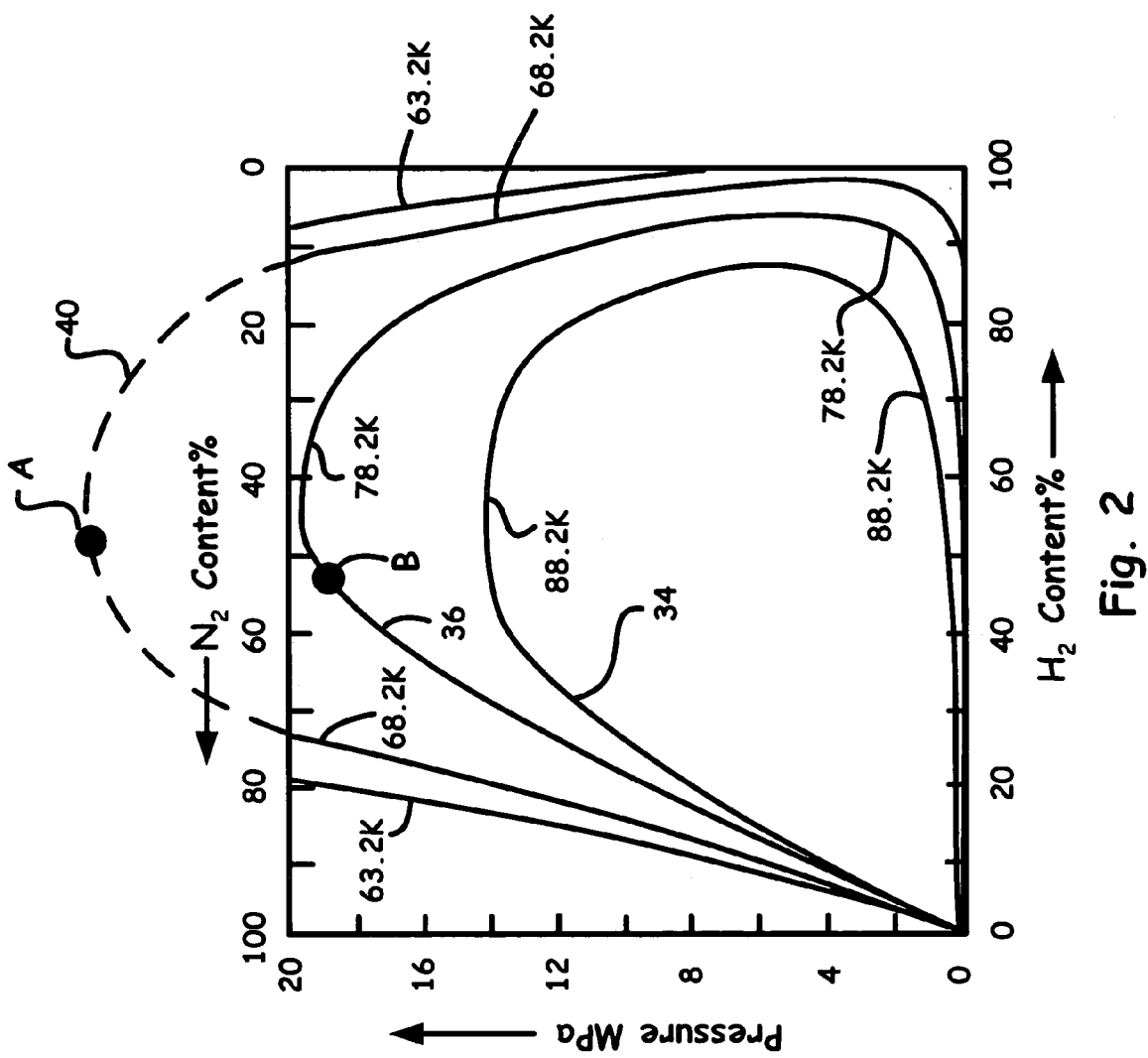
FIG. 2 illustrates example pressure-composition fluid phase equilibrium isotherm plots for Nitrogen-Hydrogen ($N_2$—$H_2$) mixtures.

FIG. 2 shows example pressure-composition fluid phase equilibrium isotherm plots for Nitrogen-Hydrogen ($N_2$—$H_2$) beneficial mixtures of the present invention. Each plot, e.g., 34 (88.2K), 36 (78.2K), 40 (68.2K), forms a closed loop isotherm wherein a maximum for each curve is a critical point (a point where the vapor and liquid phases are identical). In addition, FIG. 2 illustrates pressure dropping with increased temperature for fixed overall compositions that are capable of storing a high density of $H_2$ molecules in a predetermined phase, such as in a liquid phase (i.e., near denoted points A and B). For example, extrapolated denoted point A on isotherm 40 (68.2K), shows about 53% $H_2$, at about 30 MPa of pressure. Correspondingly, point B on isotherm 36 (78.2K), shows about 45% $H_2$, at a reduced pressure of about 19 MPa, indicating that a high density of $H_2$ can exist for fixed compositions in such liquid phase states at such regulated temperatures and pressures. For a full discussion of such plots, see "Liquid-vapour equilibrium for hydrogen+nitrogen at temperatures from 63 to 110 K and pressures to 57 MPa," by W. Street and J. Calado, J. Chem. Thermodynamics, 1978, pp. 1089–1100.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A method for storing hydrogen, comprising:
providing a container comprising a predetermined substantially fixed volume capable of remaining constant to within about 5% due to changes in pressure and temperature;
providing a fluid mixture to said predetermined substantially fixed volume, said fluid mixture comprising a high density of hydrogen molecules between about 25 kg $H_2/m^3$ and about 50 kg $H_2/m^3$; and providing a predetermined temperature and/or a predetermined pressure to said container so as to increase the density of said fluid mixture, wherein one or more predetermined phase(s) of said fluid mixture is capable of being withdrawn from said container and utilized as a fuel.

2. The method of claim 1, wherein said predetermined temperature is less than about 647 Kelvin.

3. The method of claim 1, wherein said predetermined temperature is between about 50 Kelvin and about 126 Kelvin.

4. The method of claim 1, wherein said predetermined pressure is less than about 15,000 psi.

5. The method of claim 1, wherein said predetermined pressure is capable of being less than about 5000 psi.

6. The method of claim 1, wherein said hydrogen molecules are hydrogen isotopes.

7. The method of claim 1, wherein said one or more predetermined phase(s) comprise a liquid.

8. The method of claim 1, wherein said one or more predetermined phase(s) comprise a vapor.

9. The method of claim 1, wherein said one or more predetermined phase(s) comprise a gas.

10. The method of claim 1, wherein said fluid mixture comprises a fluid selected from the group consisting of: nitrogen ($N_2$), Oxygen ($O_2$), carbon dioxide ($CO_2$), lightweight inert gases (e.g., Argon), carbon monoxide (CO), methane ($CH_4$), acetylene ($C_2H_2$), ethane ($C_2H_6$), ethylene ($C_2H_4$) ammonia ($NH_3$), propane ($C_3H_8$), and water ($H_2O$).

11. The method of claim 1, wherein said fluid mixture comprises a liquefied inert gas.

12. The method of claim 1, wherein said fluid mixture comprises liquid nitrogen.

13. The method of claim 1, wherein said fluid mixture comprises liquid oxygen.

14. The method of claim 1, wherein said fluid mixture comprises liquid carbon dioxide.

15. The method of claim 1, wherein said fluid mixture comprises a molecular concentration from about 33% $H_2$ to about 75% $H_2$.

16. The method of claim 1, further comprising the step of distributing said fuel in a container configured in a vehicle for fueling said vehicle.

17. The method of claim 1, further comprising the step of distributing said fuel in a container configured in a home for fueling purposes of said home.

18. The method of claim 1, wherein said container is conformable.

19. A hydrogen storage apparatus, comprising:
a container having a predetermined substantially fixed volume capable of remaining constant to within about 5% due to changes in pressure and temperature;
a fluid mixture comprising a high density of hydrogen molecules between about 25 kg $H_2/m^3$ and about 50 kg $H_2/m^3$, said fluid mixture capable of being disposed within said predetermined substantially fixed volume; and
a means configured to increase the density of said fluid mixture, wherein one or more predetermined phase(s) of said fluid mixture is capable of being withdrawn from said container and utilized as a fuel.

20. The apparatus of claim 19, wherein said means further comprises a heater thermally coupled to said predetermined substantially fixed volume so as to produce a temperature range between about 50 Kelvin and about 126 Kelvin.

21. The apparatus of claim 19, wherein said means further comprises a heater thermally coupled to said predetermined substantially fixed volume so as to produce a temperature range of less than about 647 Kelvin.

22. The apparatus of claim 19, wherein said means further comprises a pump coupled to said predetermined substantially fixed volume to enable a pressure of less than about 5000 psi.

23. The apparatus of claim 19, wherein said means further comprises a pump coupled to said predetermined substantially fixed volume to enable a pressure of less than about 15,000 psi.

24. The apparatus of claim 19, wherein said hydrogen molecules are hydrogen isotopes.

25. The apparatus of claim 19, wherein said one or more predetermined phase(s) comprise a liquid.

26. The apparatus of claim 19, wherein said one or more predetermined phase(s) comprise a vapor.

27. The apparatus of claim 19, wherein one or more predetermined phase(s) comprise a gas.

28. The apparatus of claim 19, wherein said fluid mixture comprises a fluid selected from the group consisting of: nitrogen ($N_2$), Oxygen ($O_2$), carbon dioxide ($CO_2$), lightweight inert gases (e.g., Argon), carbon monoxide (CO), methane ($CH_4$), acetylene ($C_2H_2$), ethane ($C_2H_6$), ethylene ($C_2H_4$) ammonia ($NH_3$), propane ($C_3H_8$), and water ($H_2O$).

29. The apparatus of claim 19, wherein said fluid mixture comprises a liquefied inert gas.

30. The apparatus of claim 19, wherein said fluid mixture comprises liquid nitrogen.

31. The apparatus of claim 19, wherein said fluid mixture comprises a molecular concentration from about 33% $H_2$ to about 75% $H_2$.

32. The apparatus of claim 19, wherein said fluid comprises liquid oxygen.

33. The apparatus of claim 19, wherein said fluid mixture comprises liquid carbon dioxide.

34. The apparatus of claims 19, wherein said container is conformable.

35. A hydrogen storage system, comprising:
one or more primary containers each having predetermined substantially fixed volumes that are each capable of remaining constant to within about 5% due to changes in pressure and temperature, further comprising:
a fluid mixture comprising a high density of hydrogen molecules between about 25 kg $H_2/m^3$ and about 50 kg $H_2/m^3$, said fluid mixture capable of being disposed within said predetermined substantially fixed volumes;
a means configured to increase the density of said fluid mixture, wherein one or more predetermined phase(s) of said fluid mixture is capable of being distributed from said one or more primary containers; and
one or more secondary containers, each having predetermined substantially fixed volumes, wherein said one or more secondary containers are arranged to receive from said one or more primary containers said one or more predetermined phase(s) of said fluid mixture for utilization as a fuel.

36. The system of claim 35, wherein said means further comprises a heater thermally coupled to said predetermined substantially fixed volume so as to produce a temperature range between about 50 Kelvin and about 126 Kelvin.

37. The system of claim 35, wherein said means further comprises a heater thermally coupled to said predetermined substantially fixed volume so as to produce a temperature range of less than about 647 Kelvin.

38. The system of claim 35, wherein said means further comprises a pump coupled to said predetermined substantially fixed volume to enable a pressure of less than about 5000 psi.

39. The system of claim 35, wherein said means further comprises a pump coupled to said predetermined substantially fixed volume to enable a pressure of less than about 15,000 psi.

40. The system of claim 35, wherein said hydrogen molecules are hydrogen isotopes.

41. The system of claim 35, wherein said one or more predetermined phase(s) comprise a liquid.

42. The system of claim 35, wherein said one or more predetermined phase(s) comprise a vapor.

43. The system of claim 35, wherein said one or more predetermined phase(s) comprise a gas.

44. The system of claim 35, wherein said fluid mixture comprises a liquefied inert gas.

45. The system of claim 35, wherein said fluid mixture comprises a fluid selected from the group consisting of: nitrogen ($N_2$), Oxygen ($O_2$), carbon dioxide ($CO_2$), lightweight inert gases (e.g., Argon), carbon monoxide (CO), methane ($CH_4$), acetylene ($C_2H_2$), ethane ($C_2H_6$), ethylene ($C_2H_4$) ammonia ($NH_3$), propane ($C_3H_8$), and water ($H_2O$).

46. The system of claim 35, wherein said fluid mixture comprises liquid nitrogen.

47. The system of claim 35, wherein said fluid mixture comprises liquid oxygen.

48. The system of claim 35, wherein said fluid mixture comprises liquid carbon dioxide.

49. The system of claim 35, wherein said fluid mixture comprises a molecular concentration from about 33% $H_2$ to about 75% $H_2$.

\* \* \* \* \*